US005752788A

United States Patent [19]

Crum

[11] Patent Number: 5,752,788

[45] Date of Patent: May 19, 1998

[54] SYSTEM AND METHOD OF PUMPING A CONSTANT VOLUME OF POWDER

[75] Inventor: Gerald W. Crum, Elyria, Ohio

[73] Assignee: Nordson Corporation, Westlake, Ohio

[21] Appl. No.: 347,053

[22] Filed: Nov. 30, 1994

[51] Int. Cl.[6] .............. B65G 53/46

[52] U.S. Cl. .............. 406/29; 406/109; 406/128; 406/143

[58] Field of Search .............. 406/109, 128, 406/142, 143, 69, 29, 144

[56] References Cited

U.S. PATENT DOCUMENTS

| | | | |
|---|---|---|---|
| 1,796,215 | 3/1931 | Peikert | 406/65 |
| 3,077,365 | 2/1963 | Fisher | 406/109 |
| 3,197,257 | 7/1965 | Krenke | 406/65 |
| 3,606,481 | 9/1971 | Stand et al. . | |
| 3,714,926 | 2/1973 | Ofner . | |
| 3,899,214 | 8/1975 | Stupfel | 406/65 |
| 4,111,493 | 9/1978 | Sperber | 406/65 |
| 4,227,835 | 10/1980 | Nussbaum . | |
| 4,284,032 | 8/1981 | Moos et al. . | |
| 4,462,061 | 7/1984 | Mommsen . | |
| 4,543,017 | 9/1985 | Beck | 406/31 |
| 4,583,883 | 4/1986 | Johanning | 406/65 |
| 4,615,649 | 10/1986 | Sharpless . | |
| 4,770,344 | 9/1988 | Kaiser . | |
| 4,834,588 | 5/1989 | Salter et al. | 406/14 |
| 4,987,001 | 1/1991 | Knobbe et al. . | |
| 5,015,126 | 5/1991 | Kramer . | |
| 5,056,720 | 10/1991 | Crum et al. . | |
| 5,240,185 | 8/1993 | Kaiju et al. . | |
| 5,323,547 | 6/1994 | Kaiju et al. . | |

FOREIGN PATENT DOCUMENTS

| | | | |
|---|---|---|---|
| 260677 | 1/1964 | Australia | 406/143 |
| 546295 | 4/1956 | Belgium . | |
| 365038 | 6/1994 | European Pat. Off. . | |
| 1045562 | 11/1953 | France . | |
| 2361149 | 10/1978 | France . | |
| 2511986 | 4/1983 | France . | |
| 2437856 | 2/1976 | Germany | 406/144 |
| 2628236 | 12/1977 | Germany | 406/144 |
| 28 07 866 | 1/1979 | Germany . | |
| 1175015 | 12/1969 | United Kingdom . | |
| 2106668 | 8/1982 | United Kingdom . | |
| 2276103 | 1/1994 | United Kingdom . | |

OTHER PUBLICATIONS

Primer on Powder Pumps by Gerald W. Crum, Eng. Mgr. Nordon Co.

Pneumatic Handling of Powdered Materials (Including Fluidization) Published for The Engineering Equipment Users Assoc. by Constable & Company Limited, London, W.C.2, E.E.U.A. Handbook No. 15: 1963.

*Primary Examiner*—Gary C. Hoge
*Attorney, Agent, or Firm*—Howard M. Cohn, Esq

[57] ABSTRACT

An apparatus and method for pumping a constant volume of powder to a powder spray gun includes a powder pump which meters the powder into a stream of air so that a constant volume of the air entrained powder is distributed to the spray gun. The invention also discloses a pressure equalizing system that prevents powder leakage across a powder metering system that meters powder from a reservoir into an outlet tube carrying the constant velocity stream of air. A control system is disclosed which adjusts the rate at which powder is metered into the outlet tube so that the mass flow of powder exiting the outlet tube remains constant.

19 Claims, 4 Drawing Sheets

38'

SYSTEM AND METHOD OF PUMPING A CONSTANT VOLUME OF POWDER

RELATED APPLICATIONS

This application relates to Assignees' co-pending U.S. application Ser. No. 08/336,469 filed Nov. 9, 1994 and entitled POWDER COATING GUN MOUNTED DIFFUSER AND AIR COOLED HEAT SINK IN COMBINATION WITH LOW FLOW POWDER PUMP IMPROVEMENTS

FIELD OF THE INVENTION

This invention relates to the field of powder pumps for pumping powder to powder spray guns. More particularly, this invention relates to an apparatus and method for pumping a constant volume of powder at a constant velocity to a powder spray gun.

BACKGROUND OF THE INVENTION

In powder coating systems, a jet pump or ejector is conventionally used to aspirate powder from a powder container or hopper and to transfer the powder through an outlet conduit to a spray device, i.e., a powder spray gun of the type disclosed in U.S. Pat. No. 5,056,720 ('720), assigned to Nordson Corp., the assignee of the present invention, which patent is incorporated in its entirety herein. The ability of a pump or ejector to control the flow rate of the powder is very important in order: a) to deliver the powder smoothly to the spray gun without surging or pulsing effects; b) to control the velocity at which the powder exits the spray gun; c) to insure that the air entrained powder is well dispersed in the air stream when it enters the charging or pattern forming structure in the spray gun; d) to minimize wear of the structural components of the gun; and e) to minimize impact fusion of the powder with the structural components of the spray gun. At present, powder pumping equipment attempts to accomplish these operating requirements incorporated varying tradeoffs and met with varying degrees of success.

A conventional system for pumping air entrained powder from a container to a spray gun is illustrated in FIGS. 5 and 6. and primarily discussed beginning on column 6, line 47 to column 9, line 54, of U.S. Pat. No. 4,987,001 ('001), assigned to Nordson Corp., the assignee of the present invention, which patent is incorporated in its entirety herein. A primary flow of air directed into pump 114 through an injector nozzle forms an air jet which creates a suction at a powder inlet. The suction at the powder inlet draws fluidized powder from a powder container 100 into pump 114 where it mixes with the air jet. The resulting air entrained powder is propelled through a venturi throat of a pipe 116 to a spray gun. Varying the air flow through the injector nozzle 12 controls the suction and the volume of powder delivered to the spray gun. The air entrained powder can then be directed through an air amplifier 117 which injects a secondary flow of air to increase and precisely control the velocity of the air entrained powder flowing through outlet pipe 116. After the air entrained powder travels for a distance (usually about 4 to 12 meters) through outlet pipe 116 to the powder gun, the powder can separate from the air stream for various reasons, such as the inertial separation effects of the bends in the conduit. To obtain a uniform spray pattern and achieve high electrostatic charging levels, the powder must be redispersed in the air stream before charging or pattern forming occurs. This redispersion can be accomplished by either adding additional air to promote strong turbulence and mixing, or mechanically inducing turbulence.

In some applications, such as when the powder stream is subdivided and distributed through multiple tubes of a triboelectric charging gun of the type described and illustrated in U.S. Pat. No. 4,399,945, assigned to Nordson Corp., the assignee of the present application which patent is hereby incorporated by reference in its entirety, the powder must be thoroughly redispersed in the air to insure that the powder is evenly distributed in the flow passage at the point of subdivision. Good results have been obtained with either air jet diffusers, as presently used in a Tribomatic II® gun manufactured by Nordson Corporation of Amherst, Ohio and described in U.S. application Ser. No. 07/956,615, filed Oct. 5, 1992, which is also hereby incorporated by reference in its entirety, or with porous diffusers as shown in the '001 patent.

A number of serious shortcomings result when a powder spray gun with an air jet diffuser is operated in conjunction with a pump having a secondary air flow injected at a downstream location, as previously discussed. First, there is an excess in both the volume and velocity of the air entrained powder being sprayed from the gun which lowers the overall coating efficiency and increases the overspray being generated and the amount of recycled powder introduced into the system. Second, the addition of a diffuser at the pump increases the control devices to three, i.e., two sets of controls, one for each of the primary and secondary air flows at the pump, and a third set of controls for the air flow through the diffuser mounted to the gun. Besides the extra cost associated with the additional set of controls, the adjustment of the three sets of controls to obtain the optimum settings is difficult and time consuming, especially for an inexperienced operator. Third, certain types of pattern forming elements and some powder charging schemes are not practical without a high degree of powder dispersion at the gun.

Therefore, there is a need for a practical and easy to use system for pumping air entrained powder at a low flow rate to an electrostatic gun so that the powder formulation can be effectively sprayed to apply a uniform coating on a workpiece.

OBJECTS AND SUMMARY OF THE INVENTION

It is an object of the present invention to provide an apparatus and method for pumping a constant volume of powder to a powder spray gun to obviate the problems and limitations of the prior art systems.

Yet another object of the present invention is to provide a powder pump and method of operation which meters powder into a constant velocity stream of air so that a constant volume of air entrained powder is delivered to the powder spray gun.

Still another object of the present invention is to provide an apparatus and method for metering powder into a constant velocity stream of air so that the resulting air entrained powder is conveyed at a constant velocity to a powder spray gun.

Yet another object of the present invention is to provide an apparatus and method for equalizing the pressure across a powder metering system which meters powder from a reservoir into a constant velocity stream of air flowing through a conduit tube so that a constant volume of air entrained powder exits the conduit tube for delivery to a spray gun.

Another object of the present invention is to provide an apparatus and method for metering powder from a reservoir into the outlet tube carrying a constant velocity stream of air which includes a system for equalizing the pressure between the reservoir and the outlet tube and air isolation device in the reservoir to prevent air leakage out of the inlet of the reservoir.

According to the invention, a constant volume conveying method and system for pumping a constant volume of air entrained powder to a spray gun includes a cylindrical outlet tube having an inlet receiving a constant velocity of pressurized air at one end, an outlet discharging a constant volume of the air entrained powder at an opposite end, and a powder inlet connected to a reservoir of powder disposed between the inlet and the outlet. The reservoir includes an inlet section and a funnel shaped section secured to and disposed directly below the inlet section. A powder pickup tube has an inlet section at one end inserted into a container of air entrained powder and an outlet opening at the opposite end for discharging the air entrained powder from the container into the inlet section of the reservoir. A powder metering system secured to the outlet of the reservoir includes a multi-vane, helical rotary lock disposed below the funnel shaped section for metering the air entrained powder through the outlet tube's powder inlet and into the constant velocity air stream flowing through the cylindrical outlet tube to provide a flow of air entrained powder at a constant volume and constant velocity to the spray gun.

Further in accordance with the invention, a constant volume conveying method and system includes an expansion nozzle for directing a constant volume of air into a cylindrical outlet tube. The expansion nozzle is connected at one end to a source of compressed air and at the opposite end to the cylindrical outlet tube. The powder inlet in the cylindrical outlet tube receives coating powder from the reservoir which in turn is constantly being filled with coating powder from a container of coating powder. The powder from the reservoir is then metered by the metering system into the cylindrical outlet tube.

According to the invention, the constant volume conveying method and system includes a pressure equalizing system for equalizing the pressure between the reservoir and the cylindrical outlet tube to balance the pressure and prevent powder leakage from the outlet tube and into the reservoir. The pressure equalizing system includes a tube interconnecting the cylindrical outlet tube and the funnel shaped section of the reservoir so that the pressure in the funnel shaped section is substantially equal to the pressure in the outlet tube. The pressure equalizing system further includes an isolation device mounted within the reservoir to substantially reduce any air leakage from the funnel shaped section and out of the inlet section of the reservoir. In a first embodiment, the isolation device includes an impeller with vanes that seal against walls of the inlet section of the reservoir. In a second embodiment, the isolation device includes two spaced slide gates which reciprocate to open and close the powder flow path through the reservoir. In a third embodiment, the isolation device includes two spaced ball valves which rotate to open and close the powder flow path through the reservoir. In a fourth embodiment, the isolation device includes two valve plates with out of phase holes which rotate to open and close the powder flow path through the reservoir.

The invention also includes a controller method and system which operates the powder metering system in response to a sensor in the reservoir that measures the density of the powder in the funnel section and adjusts the amount of powder metered into the conduit tube to feed a constant volume of powder into the cylindrical outlet tube. The controller system also includes a capacitor sensor in the conduit tube to measure changes in the density of the powder flow therethrough and to adjust the powder metering system so that a substantially constant mass of powder flows through the conduit tube.

BRIEF DESCRIPTION OF THE DRAWINGS

The structure, operation, and advantages of the presently preferred embodiment of the invention will become further apparent upon consideration of the following description taken in conjunction with the accompanying drawings, wherein.

DETAILED DESCRIPTION OF THE INVENTION

Figure 1:
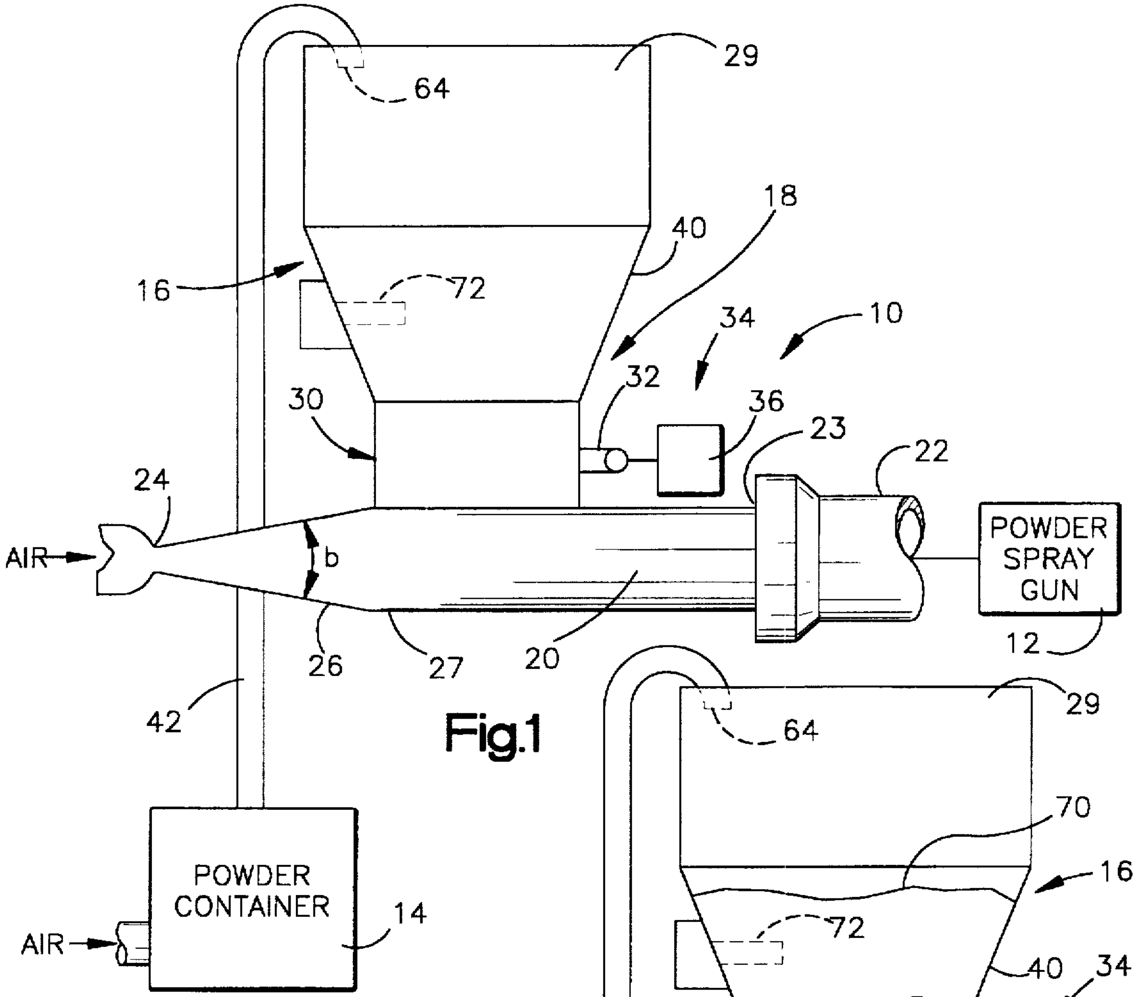
FIG. 1 is a side elevational schematic illustration of a system for pumping a constant volume of powder to a powder spray gun, constructed according to the principles of the present invention.

With reference to FIG. 1, there is illustrated a schematic of a constant volume conveying system 10 for conveying air entrained coating powder to a powder spray gun 12. The system 10 includes a fluidized bed powder container or hopper 14 which is constructed in accordance with the principles set forth in Assignees' co-pending U.S. application Ser. No. 08/336,469 and described in detail below. Fluidized powder is transferred from container 14 into a reservoir 16 with a powder metering system 18 at the outlet for metering powder into the powder inlet 25 of a cylindrical outlet tube 20 of constant volume conveying system 10. The powder mixes with a stream of substantially constant velocity air flowing through outlet tube 20 and is discharged as an air entrained powder from an outlet 23 into a delivery conduit 22, typically a flexible hose, which in turn transfers the powder to powder spray gun 12, such as a tribocharging or corona charging gun. The stream of air entrained powder from system 10 is electrostatically charged in the body of the gun and then sprayed from the spray nozzle section (not shown) of gun 12 towards an article being coated. While a tribocharging gun is described herein, a conventional corona-discharge electrode arrangement can be substituted.

A principle feature of the invention relates to the ability of constant volume conveying system 10, as illustrated in FIG. 1, to provide a soft, controllable, powder spray pattern. In this embodiment, the flow of compressed air from a supply (not shown) is transferred through an inlet orifice 24 to create an air jet in an expansion nozzle 26 which flows from expansion nozzle outlet 27 and into outlet tube 20. Expansion nozzle 26 has an approximate included angle "b" of less than about 19 degrees and preferably about 17 degrees. The included angle "b" is selected to prevent flow separation and turbulence in the air entrained powder flow through cylindrical outlet tube 20. That is, the air jet is expanded in expansion nozzle 26 to provide a smooth, conveying air flow through outlet tube 20 into which a very "rich" powder/air mixture (high ratio of powder to air) is metered by powder metering system 18. The rich powder/air mixture only requires a small volume of conveying air flow to thoroughly mix the powder/air with the constant velocity air flow from expansion nozzle 26 so that a substantially constant volume of air entrained powder flows through delivery conduit 22 at a substantially constant velocity.

In one operational constant volume conveying system, the conveying air flows through an inlet orifice 24 having a diameter of about 0.060 inches. For an outlet tube 20 having a 0.50 inch inside diameter, an air volume of about 2.0 cubic feet per minute (cfm) causes the air entrained powder metered onto outlet tube 20 to have a velocity which is close to optimum velocity, i.e., about 1500 feet per minute. To reach this velocity, about 50 psi is needed on the upstream side of orifice 24. Since the backpressure in outlet tube 20 is typically less than 1 psi, the pressure drop across orifice 24 is the primary factor in controlling the flow rate of the air through outlet tube 20. Thus, a constant pressure drop across orifice 24 creates a flow of air entrained powder with a substantially constant volume and velocity irrespective of the volume of powder in the air flow or the length of tube 20.

Two important considerations in the operation of the constant volume conveying system 10 are: a) selecting the air flow across inlet orifice 24 so that the pressure is just enough to overcome the back pressure in tube 20; and b) injecting fluidized coating powder into the constant velocity of air flowing through tube 20 with the minimum accompanying volume of air to maintain the volume of air entrained powder flowing through tube 20 as nearly constant as possible.

Figure 2:
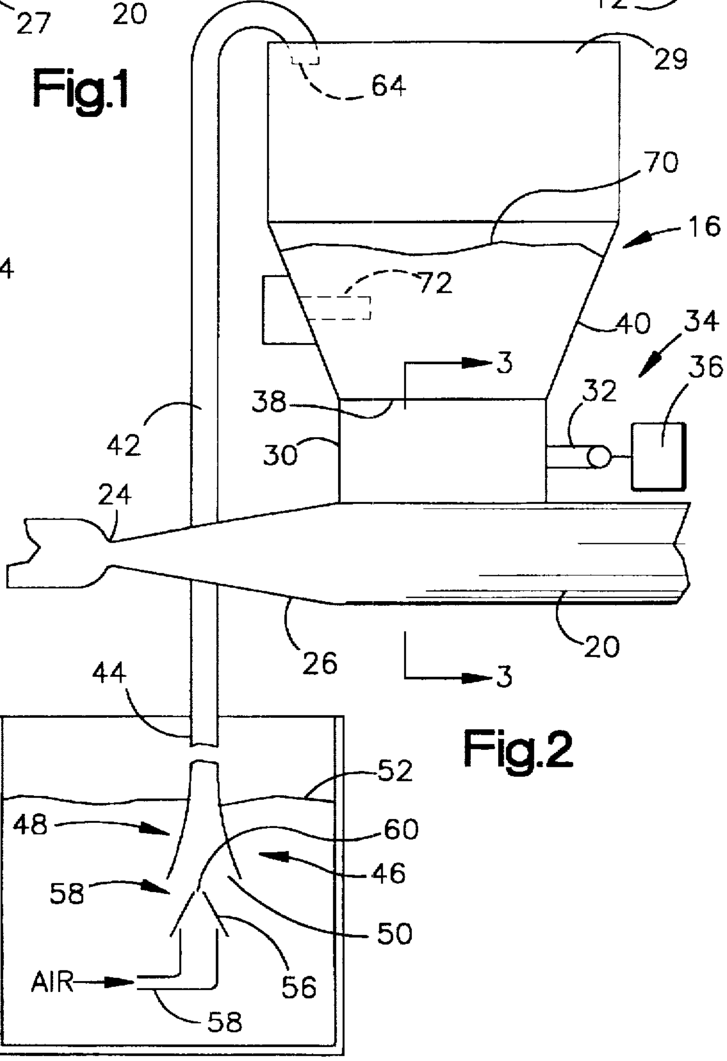
FIG. 2 is a side elevational schematic illustration of the system for pumping shown in FIG. 1 showing the details of an apparatus to transfer powder from the powder container to the reservoir.
Figure 3:
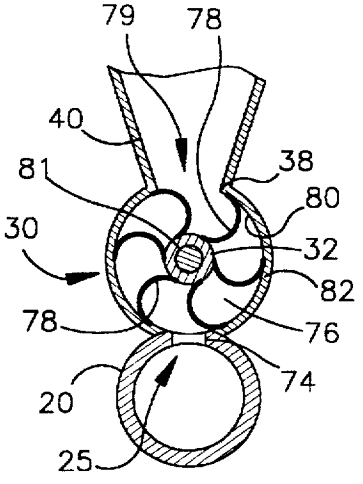
FIG. 3 is a view taken along line 3—3 of FIG. 2 showing the details of the mechanical powder metering system for metering powder from a reservoir into a conduit tube.

FIGS. 1–3 illustrate an effective technique and structure by which powder can be injected into the air stream flowing through outlet tube 20 of constant volume system 10. A reservoir 16 of air entrained powder is disposed directly above outlet tube 20. Reservoir 16 has an inlet section 29 at the top end for receiving air entrained powder and a powder metering system 18 at the bottom for dispensing the air entrained powder into the stream of air flowing through tube 20. Powder metering system 18 includes a multi-vane, helical rotary lock 30, as shown in FIG. 3. The powder is metered into the stream of constant velocity air flowing through cylindrical outlet tube 20 by the rotation of rotary lock 30. A connection shaft 32, which is part of a drive system 34, is secured at one end to the impeller of rotary lock 30 and at the other end to a power source, such as a stepper motor 36. The volume of powder metered into outlet tube 20 is controlled by the rotational speed of rotary lock 30.

Being that the volume of powder metered by the rotary lock 30 is a function of its bulk density, it is advantageous that lock 30 be supplied by a source of powder with a constant head height to keep the degree of powder packing relatively constant. A constant head height can be achieved by placing lock 30 directly below an outlet opening 38 of a funnel shaped well section 40, as shown in FIG. 3. The well section 40 is filled with air entrained powder which pours in under the influence of gravity from inlet section 29 of reservoir 16. Inlet section 29, in turn, is filled with air entrained powder delivered through a powder pickup tube 42. Pickup tube 42 can be connected at a lower end 44 to a source of air entrained powder, such as a powder fountain 46 located in fluidized bed powder container 14, as discussed below.

Powder fountain 46, as illustrated in FIG. 2, includes a flow inducer 48 to provide a rich mixture of powder with minimum air volume. The inlet section 50 of flow inducer 48 has a flared opening and is located beneath the surface 52 of air entrained powder 54. Flow inducer 48 has a nozzle 56 with an air inlet 58 positioned to direct air through an outlet opening 60 and into the flared opening of inlet section 50 of tube 44. This flow of air draws fluidized powder 54 into inlet section 50 of tube 44 and carries the resulting mixture of powder and air to the outlet 64 of tube 42 for discharge into inlet section 29 of reservoir 16.

An important requirement of system 10 is to minimize the volume of air needed to carry the powder from hopper 14 to the cylindrical tube 20. Therefore, the volume of air flow discharged through inlet 58 is adjusted to the minimum value needed to deliver a "rich" powder/air mixture into the air flowing through tube 42. By adjusting the pressure of compressed air through air inlet 58 into injector nozzle 56 of flow inducer 48 with an air regulator or valve (not shown), the volume of air entrained powder discharged into reservoir 16 can be controlled. It is noteworthy that since flow inducer 48 uses only a small volume of air, the velocity of the air entrained powder flowing through pickup tube 42 is low. Further, the velocity of the air entrained powder flowing through powder conduit 20 is also held to a constant, optimum value which minimizes wear and impact fusion on component parts of powder spray gun 12, as compared with prior art pumping systems. While a specific design of a flow inducer is described, it is within the terms of the invention to substitute another flow inducer design or other type of powder pump to deliver a rich mixture of powder, typically air entrained powder, with a minimum air volume to reservoir 16.

The air entrained powder is discharged from powder container 14 into inlet section 29 of reservoir 16 so that the powder surface 70 in shaped funnel or well section 40 is kept at a fixed location and the powder density is kept substantially constant in the shaped funnel section. Any excess powder above surface 70 is drained out of well 40 through a weir (not shown). To insure that the powder density is kept constant, the powder is continually monitored by a capacitance probe 72 disposed in well section 40. The capacitance of the air entrained powder is a function of the dielectric constant (permitivity) of the material surrounding it. As long as the permitivity of the powder is maintained at a constant value, the powder density remains uniform so that a substantially fixed mass of powder is discharged through the outlet opening 38 of well section 40.

Figure 5:
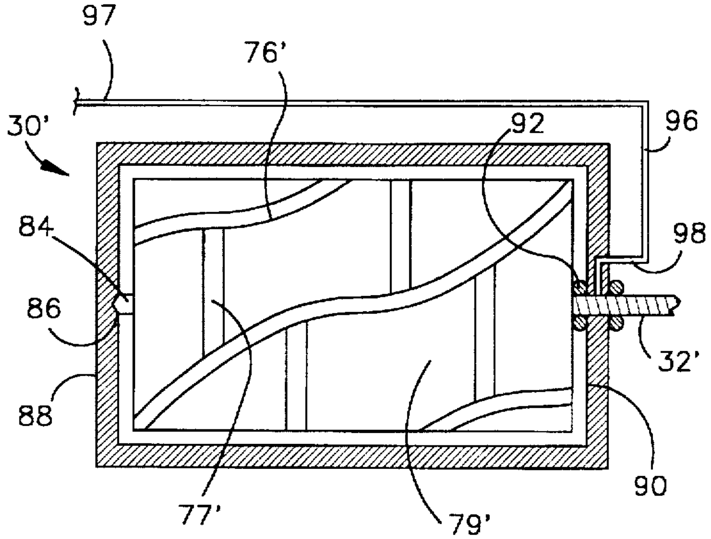
FIG. 5 is view taken along line 5—5 of FIG. 4 showing a cross sectional view of the rotary metering lock.

Rotary lock 30 also provides an air tight seal between a powder inlet opening 74 of outlet tube 20 and outlet opening 38 of well section 40. The seal eliminates air leakage from the high pressure air in conduit tube 20 to funnel section 40 which could hinder the filling of the cavities or pockets 76 between helical vanes 78 in rotary lock 30, as shown in FIG. 3. Rotary lock 30 preferably incorporates an impeller 79 formed of a cylindrically shaped component 81 with a plurality of vanes 78 integrally connected and extending outwardly therefrom. Impeller 79 is preferably constructed of a compliant material, such as, for example, molded rubber or elastomer and incorporates shaft 32 extending axially tube 81. Vanes 78 are preferably formed in a helical configuration to discharge a smooth and substantially continuous flow of air entrained powder through powder inlet opening 74 and into conduit tube 20. The vanes 78 can also be curved along the longitudinal axis, as shown in FIG. 5. While shaped vanes of different configurations can be substituted for helical vanes 78, conventional straight vanes, which are best used in selected applications, have a tendency to discharge discrete chunks of powder causing pulsed powder flow. It is within the terms of the invention to provide dividers 77', as shown in FIG. 5, between vanes 78. The dividers extend radially outward from impeller 79 to provide more precise control of the powder flow through inlet opening 74 and into outlet tube 20.

While the rotary lock metering system 18 shown in FIGS. 1–3 is suitable for its intended purpose, its use in a commercial environment can necessitate the need to reduce the amount of pressurized air in cylindrical tube 20 which leaks around vanes 78 and the ends of impeller 79 into funnel shaped section 40 of reservoir 16. Air flow in this direction reduces the volumetric efficiency of impeller 79 of rotary lock 30, and also reduces the accuracy with which metering system 18 delivers air entrained powder into cylindrical tube 20. Therefore, in the embodiment shown in FIGS. 2 and 3, it is important to insure that the outer tips and ends of impeller vanes 78 are tightly sealed against the inner surface 80 of rotary lock housing 82.

Figure 4:
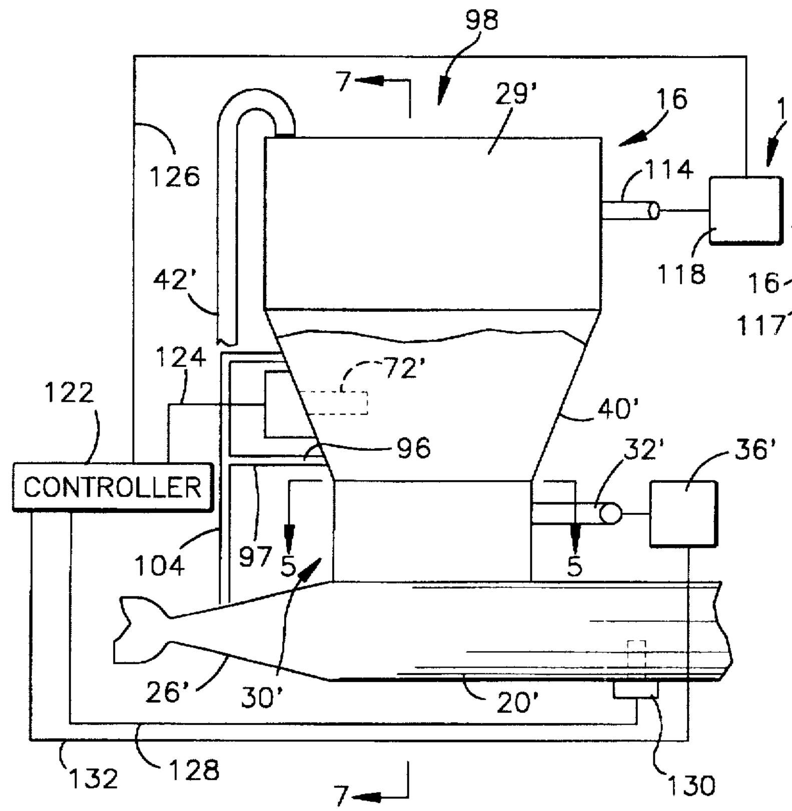
FIG. 4 is a side elevational schematic illustration of another embodiment of a constant volume pump system which includes a pressure equalization system to equalize the pressure across a rotary metering lock device which meters powder from a reservoir into a conduit tube.
Figure 6:
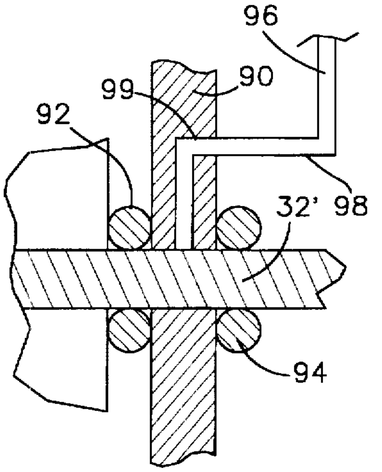
FIG. 6 is an enlarged view of a channel to direct pressurized air between the spaced seal assemblies on the connection shaft extending outward from the impeller of the rotary lock.

While the embodiment of the constant volume conveying system shown in FIGS. 1–3 is operable, the embodiment of a constant volume conveying system 98, as shown in FIGS. 4–6, eliminates the majority of the maintenance and design problems described above and provides a more accurate and robust metering system. As described above regarding the embodiment of FIGS. 1–3, the embodiment of FIG. 4 includes a mechanical powder metering system 18' with a multi-vane, helical rotary lock 30'. Throughout the specification, primed, double primed, triple primed, and quadruple numbers represent structural elements which are substantially identical to structural elements represented by the same unprimed number. The powder is metered into the stream of air entering cylindrical outlet tube 20' by the rotation of rotary lock 30'. A drive shaft 32' is secured at one end to rotary lock 30' and at the other end to a motor 36'. The volume of metered powder is controlled by the rotational speed of rotary lock 30'. Since the volume of powder metered by the rotary lock 30' is a function of its bulk density, it is important that lock 30' be fed from a source of powder with a constant head height to control the "packing" of the powder. This requirement can be met by placing lock 30' directly below an outlet opening 38' of a funnel shaped well 40' section of reservoir 16'. The well 40' is filled with powder delivered through a pickup tube 42', which in turn is connected to source of air entrained powder, such as a powder fountain, located in fluidized bed powder container.

A pressure equalizing system 99 is incorporated in system 98' to prevent leakage from the tube 20' across metering system 18' and into reservoir 16'. System 99 includes an isolation device 100 placed between the inlet of funnel shaped section 40' and inlet section 29' of reservoir 16'. The pressure equalizing system 99 includes a pressure equalizing tube 104 interconnecting outlet tube 20' and funnel shaped section 40' to allow pressurized air in expansion nozzle 26' to flow into the funnel shaped well section 40' between the isolation device 100 and rotary lock 30'. With the addition of pressure equalizing tube 104, rotary lock 30' is in a pressure balanced condition with little or no differential pressure across impeller 38'. This pressure balanced condition results in vanes 78' of lock 30' requiring only a relatively good mechanical seal between the tips and edges of the impeller vanes 78' and the inner surface 80' of rotary lock housing 82 to prevent powder in funnel shaped section 40' from leaking between the clearances at the ends and sides of vanes 78' and inner surface 80'. Since an air tight seal between vanes 78' and inner surface 80' is no longer necessary, factors relating to the design and wear of impeller 38', which were thought to be a deficiency of the embodiment shown in FIGS. 1–3, are substantially reduced and the volumetric efficiency and precise metering of powder into outlet tube 20' are substantially improved. A feature of pressure balancing tube 104 is its location in outlet tube 20' upstream of lock 30' so that the air introduced into funnel shaped section 40' is free of powder. The flow capacity of pressure balancing tube 104 is also small compared to outlet tube 20' so that air flow through tube 104 has no significant effect on the flow velocity through tube 20'.

Referring to FIGS. 4, 5, and 6, there is illustrated a seal design which reduces the need for close tolerances between impeller 38' and the rotary lock housing 82' to prevent leakage of air therebetween. As shown in FIG. 5, one end of the drive coupling shaft 32' can have a rounded or conical tip 84 which is rotatably received within a blind bore 86 in end plate 88 of rotary lock housing 82'. The opposite end of drive coupling shaft 32' can extend through an aperture in end plate 90 of rotary lock housing 82.

As best seen in FIG. 6, a seal 92, preferably formed as an integral part of impeller 38', is located between impeller 38' and end plate 90 to provide self sealing against the interior facing surface of end plate 90. In this embodiment, impeller 38' is preferably constructed of a molded rubber or elastomer material. A second seal 94, such as an oil lip or Bal® seal, is mounted on shaft 32' and abuts against the exterior facing surface of end plate 90.

A principle feature of this invention is the provision of a pressure balancing tube 96 having one end 97 tapped into outlet tube 20' at a location upstream of lock 30'. Tube 96 is preferably tapped into balancing tube 104 which in turn is tapped into outlet tube 20'. The opposite end 98 of tube 96 is attached to the inlet of a pressure channel 99 located in end plate 90 and opening on the exterior facing surface thereof. The opposite end of channel 99 opens onto the interface of the aperture through which shaft 32' extends. The pressurized air from outlet tube 20' pressurizes the space in the aperture between seals 92 and 94. The result is to substantially prevent air leakage from the interior of rotary wall 30' across the inner seal 92 because the pressure on either side of seal 92 is substantially equal.

Figure 7:
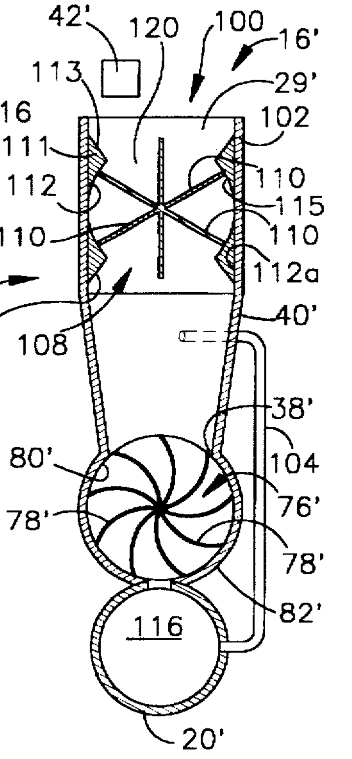
FIG. 7 is view taken along line 7—7 of FIG. 4 showing a first embodiment of an isolation device which includes an impeller with vanes that seal against walls of the inlet section of the reservoir.

As shown in FIG. 7, isolation device 100 can be constructed of an impeller 108 having vanes 110 that form a mechanical seal with the inner surface of an insert 111 mounted between the opposite walls 112 and 112A of isolation device 100. Insert 111 has an inlet section 113 which funnels powder into an adjoining central section 115. Central section 115 has an arced surface that engages vanes 110 and forms a mechanical seal therewith. The angle of the arc of engagement is greater than the angle between two adjacent vanes 110, as shown in FIG. 7, to insure that the powder is trapped in the pockets 120 therebetween as the impeller 108 rotates within insert 111. An outlet section 117 of insert 111 funnels the powder from central section 115 into the funnel shaped section 40'.

Isolation device 100 is connected by a drive shaft 114 to a control device 118, such as a stepper motor. The volume of metered powder is partially controlled by the rotational speed of isolation device 100. The pocket 120 between each of the vanes 110 is filled with powder delivered through a pickup tube 42'. Pickup tube 42' can be connected at a lower end to a source of air entrained powder such as a powder fountain located in a fluidized bed powder container, as described in the embodiment of FIGS. 1–3. The mechanical seal of the ends of impeller vanes 110 with inner surface of central section 115 need not be an air tight seal because impeller 108 is not a precision metering device but merely used to deliver powder into the funnel shaped section 40'. The requisite characteristics of isolation device 100 is that it have a greater volumetric throughput than lock 30', that it achieve a reasonable but not air tight seal, and that the powder is transferred through it by gravity. It is also important that when funnel shaped section 40' is completely full of powder, isolation device 100 is of a design that continued operation does not force additional powder into section 40'. In some cases, a small amount of air leakage through isolation device 100 can have the beneficial effect of keeping the powder in reservoir 16' above isolation device 100 loose and free flowing. Therefore, in certain designs, it is beneficial to make such leakage deliberate and controlled in volume and location.

Normally device 100 is driven from the same drive mechanism, ie. through gears or belts, as lock 30' and its increased throughput can be accomplished by higher speed and/or larger volume. A principle aspect of the invention, relates to a control system 122 which controls the rotary speed of rotary lock 30'. As previously discussed, there are two primary factors in controlling the amount of powder metered into conduit tube 20'. The first is the speed of rotation of rotary lock 30' and the second is the density of the powder. As discussed before, the speed of rotation of rotary lock 30' can be accurately controlled with a stepper motor 36' and the density of the powder, whose capacitance is a function of its dielectric constant, can be constantly monitored by a capacitance probe 72' disposed in funnel shaped section 40'. Controller 122 is connected to sensor 72' by line 124, to stepper motor 118 by line 126, to stepper motor 36' by line 132, and to a sensor 130 (such as a capacitance sensor disposed in conduit tube 20' at a location downstream of rotary lock 30') by line 132. In the operation of controller system 122, when the density of the powder in funnel shaped section 40' changes, such as by deaerating, sensor 72' measures the change in its permitivity and adjusts the speed of the impeller 76' to meter a constant mass of powder into tube 20'. Concurrently, capacitor sensor 130 measures changes in the density of the powder flow through conduit 20'. Controller 122 can compensate for any changes by varying the rotary speed of rotary lock 30' so that a substantially fixed mass of powder flows through conduit tube 20'. Controller 122 can also control the speed of rotation of impeller 108 and if necessary, turn impeller 108 completely off in the event it is driven by independent drive means and is supplying too much powder into funnel shaped section 40'.

Figure 8:
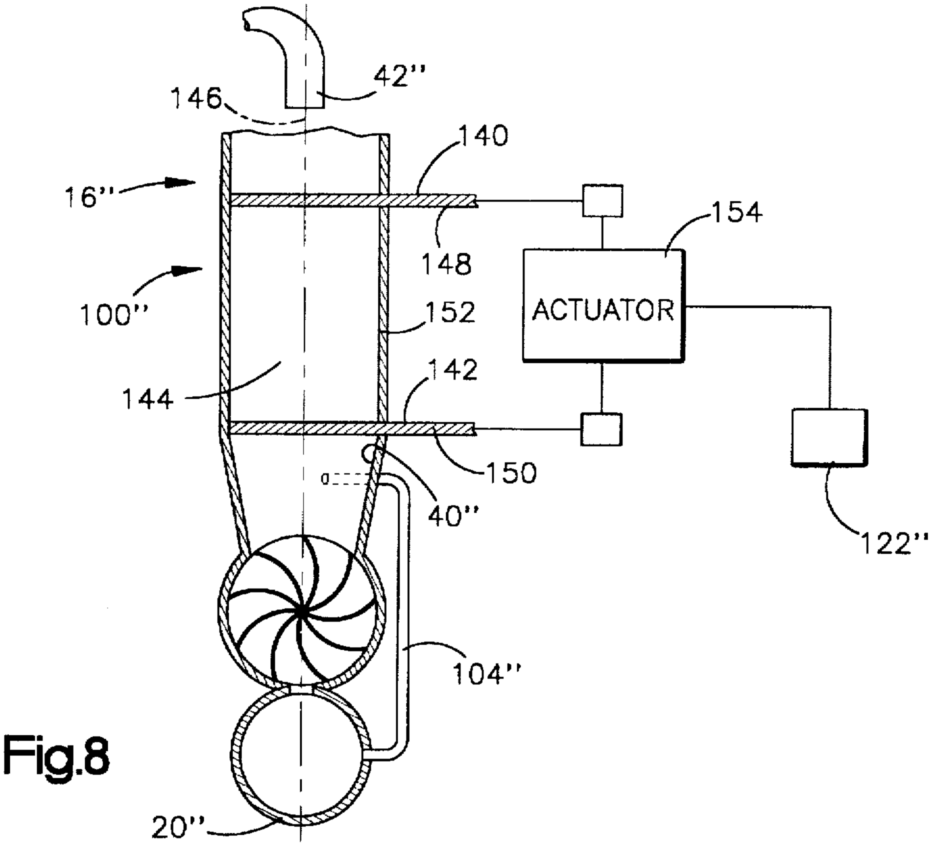
FIG. 8 is a cross sectional view showing a second embodiment of an isolation device which includes two spaced slide gates that reciprocate to open and close the powder flow path through the reservoir for use in the embodiment shown in FIG. 4.

Referring to FIG. 8, there is illustrated an alternative embodiment of an isolation device 100" in reservoir 16" which includes two spaced slide gates 140 and 142 with a powder storage section 144 therebetween. Each of the slide gates 140 and 142 extend substantially perpendicular to the longitudinal axis 146 through reservoir 16" and have actuating arms 148 and 150, respectively, which extend through the side wall 152 of section 144 and outward therefrom. Slide gates 140 and 142 reciprocate to open and close the powder flow path through reservoir 16". Preferably, a motor or actuator 154 is connected by a conventional mechanical power transfer mechanism to arms 140 and 142 to reciprocate them back and forth as required. The actuator 154 can be controlled by a controller 122".

In the operation of isolation device 100", slide gates 140 and 142 can both be opened during startup in order to charge funnel shaped section 40" with powder from tube 42". Subsequent to startup, gates 140 and 142 are moved sequentially so that one is always closed. This insures that the pressure in funnel shaped section 40", as established by tube 104", is always substantially equal to the pressure in conduit tube 20".

Figure 9:
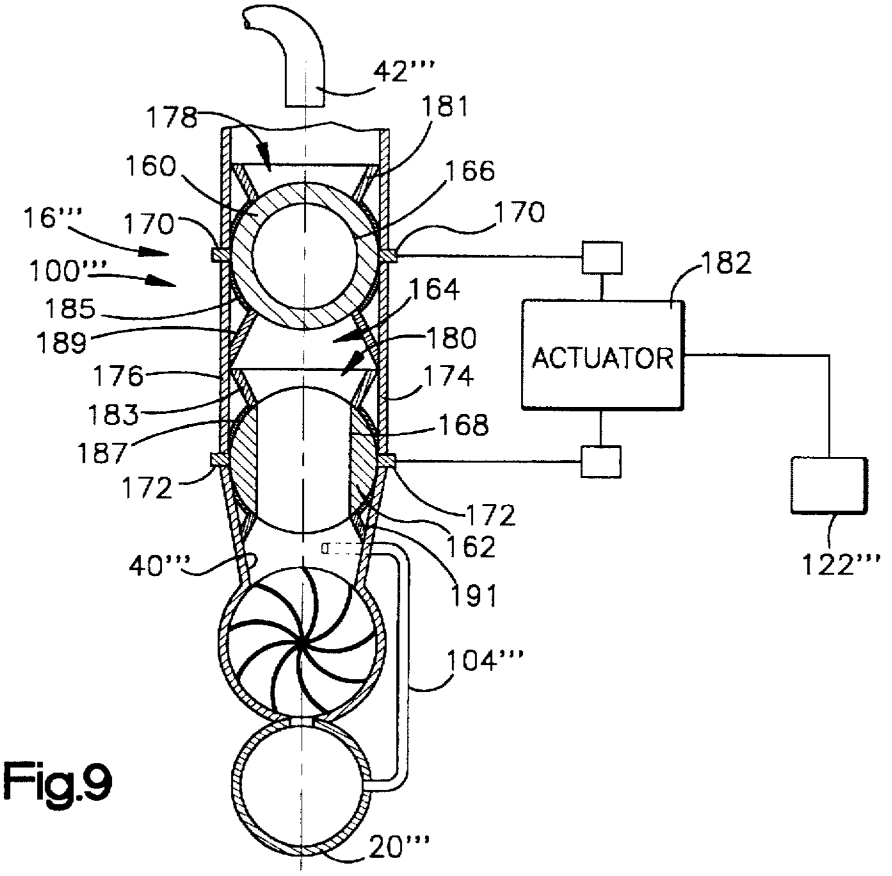
FIG. 9 is a cross sectional view showing a third embodiment of an isolation device which includes two spaced ball valves which rotate to open and close the powder flow path through the reservoir for use in the embodiment shown in FIG. 4.

Referring to FIG. 9, there is illustrated another alternative embodiment of an isolation device 100''' in reservoir 16''' which includes two spaced ball valve 160 and 162 with a powder storage section 164 therebetween. Each ball valve 160 and 162 has a bore 166 and 168, respectively, extending therethrough. Also, ball valves 160, 162 each have a pair of pivot pins 170 and 172, respectively, which are pivotally secured in openings through side walls 174 and 176 of powder storage section 164. Ball valves 160 and 162 are disposed within cylindrical inserts 178 and 180, respectively, which include a cylindrical, funnel shaped inlet section 181 and 183, respectively, that funnels powder into bores 166 and 168 of ball valves 160 and 162, respectively. Ball valves 160 and 162 are mounted in central cylindrical shaped sections 185 and 187 of cylindrical inserts 178 and 180, respectively, which are adjoined to inlet sections 181 and 183, respectively, at one end and to downstream cylindrically shaped exit sections 189 and 191, respectively, at the opposite end. Central sections 185 and 187 have an arced surface that forms a mechanical seal with ball valves 160 and 162, respectively. The diameter of the portion of the inlet and outlet sections 181, 183 and 189, 191, respectively, which engage ball valves 160 and 162, respectively, is less than the diameter of bores 166 and 168, respectively. This size relationship reduces any powder leakage from bores 166 and 168 so that the powder flow which funnels into the downstream cylindrically shaped exit sections 189 and 191, respectively, can be controlled. Also, this size relationship helps prevent powder from collecting between the inner surfaces of cylindrical shaped sections 185 and 187 and ball valves 160 and 162, respectively.

The ball valves 160 and 162 rotate to open and close the powder flow path through reservoir 16'''. Preferably, an actuator 182, such as a stepper motor, is connected by conventional means to pivot pins 170 and 172 to rotate the ball valves, as required. The actuator 182 can be controlled by a controller 122'''.

In the operation of isolation device 100''', ball valves 160 and 162 can both be opened during startup in order to charge funnel shaped section 40''' with powder from tube 42'''. Subsequent to startup, the ball valves 160 and 162 are rotated sequentially so that one valve always remains closed. This insures that the pressure in funnel shaped well 40''', established by tube 104''', is always substantially equal to the pressure in conduit tube 20'''.

Figure 10:
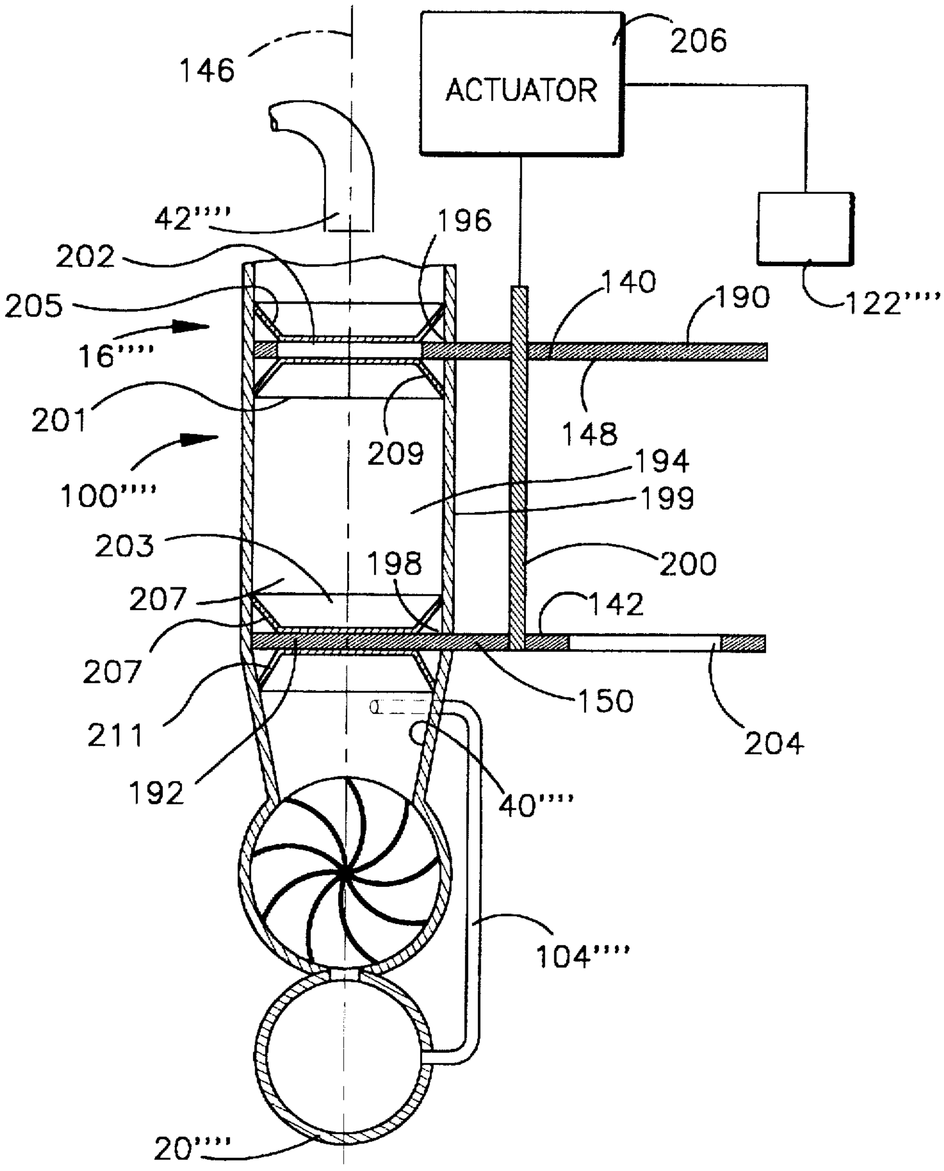
FIG. 10 is a cross sectional view showing a fourth embodiment of an isolation device which includes two valve plates with out of phase openings that rotate to open and close the powder flow path through the reservoir for use in the embodiment shown in FIG. 4.

Referring to FIG. 10, there is illustrated another alternative embodiment of an isolation device 100'''' in reservoir 16'''' which includes two spaced, rotary valve plates 190 and 192 forming a powder storage section 194 therebetween. The valve plates 190 and 192 are circular and are secured at their centers to a shaft 200 which is parallel to axis 146 through reservoir 16''''. Plates 190 and 192 extend outward from reservoir 16'''' through sealed slot openings 196 and 198, respectively, in the side wall 199 of section 194. Each valve plate 190 and 192 has a through opening 202 and 204, respectively, located to one side of shaft 200. Valve plates 190 and 192 are rotated by shaft 200, respectively, through slot openings 196 and 198 in side wall 199. Valves plates 190 and 192 are disposed within cylindrical insert elements 201 and 203, respectively, which include upper cylindrical, funnel shaped inlet sections 205 and 207, respectively, that funnel powder into openings 202 and 204, respectively, of valve plates 190 and 192. Insert elements 201 and 203 also lower cylindrical shaped exit sections 209 and 211, respectively, for directing powder into funnel section 40''''. The upper and lower sections 205, 207 and 209, 211, respectively, form a mechanical seal with valve plates 190 and 192, respectively.

Valve plates 190 and 192 are secured to shaft 200 so that through openings 202 and 204 are out of phase, i.e. preferably about 180° apart. It is within the terms of the invention to vary the angle with which openings 202 and 204 are set with respect to each other as desired. As shown in FIG. 10, whenever valve plate 190 is open, i.e. the flow path through opening 202 into powder storage section 194 is open, the valve plate 192 is closed, i.e. the flow path through opening 204 out of powder storage section 194 and into funnel section 40'''' is closed, and vice versa.

Preferably, a motor or actuator 206 is connected through a conventional drive mechanism (not shown) to shaft 200 so as to rotate the shaft, as required. The actuator 206 can be controlled by a controller 122''''.

In the operation of isolation device 100'''', valve plates 190 and 192 can be rotated continually during startup in order to charge funnel shaped section 40'''' with powder from tube 42''''. Subsequent to startup, the valve plates 190 and 192 are rotated at a rate so that the pressure in funnel shaped well 40'''', established by tube 104'''', is always substantially equal to the pressure in conduit tube 20''''.

It is apparent that there has been provided in accordance with this invention an apparatus and method for pumping a constant volume of air entrained powder to a powder spray gun to obviate the problems and limitations of the prior art systems. According to the invention, the powder pump meters powder into a stream of air so that a constant volume of air entrained powder is directed to the spray gun. The invention also discloses a pressure equalizing system that prevents powder leakage across the powder metering system which meters powder from a reservoir into a conduit tube. A control system is disclosed which adjusts the rate at which powder is metered into the outlet tube so that the mass flow of powder exiting the outlet tube remains constant.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

I claim:

1. A constant volume conveying system adapted for pumping powder to a spray gun, comprising:
   - an outlet tube having an inlet at one end to receive a pressurized air stream, an outlet at an opposite end, and a powder inlet between said inlet and said outlet to receive metered powder from a reservoir of said powder;
   - an expansion nozzle connected to said outlet tube, said expansion nozzle having an inlet orifice at one end being adapted for connection to a source of pressurized air and an expansion outlet at an opposite end, said expansion outlet connected to said inlet of said outlet tube for directing said air stream into said outlet tube;
   - a powder metering system between said reservoir and said powder inlet for metering said powder through said powder inlet and into said air stream flowing through said outlet tube; and
   - said expansion nozzle having an included angle of less than about 19 degrees.

2. The constant volume conveying system of claim 1 wherein said expansion nozzle phase an included angle of about 17 degrees.

3. A constant volume conveying system adapted for pumping powder to a spray gun, comprising:
   - an outlet tube having an inlet at one end to receive a pressurized air stream, an outlet at an opposite end, and a powder inlet between said inlet and said outlet to receive metered powder from a reservoir of said powder;
   - a powder metering system between said reservoir and said powder inlet for metering said powder through said powder inlet and into said air stream flowing through said outlet tube;
   - a pressure equalizing system for equalizing the pressure between said reservoir and said outlet tube;
   - a pickup tube having an inlet section at one end for insertion into a container of said powder and an outlet opening at an opposite end for discharging said powder directly into said reservoir; and
   - a flow inducer disposed beneath the surface of said powder in said powder container for lifting said powder up said pickup tube and discharging said powder directly into said reservoir.

4. The constant volume conveying system of claim 3 wherein said inlet section of said pickup tube has a flared opening.

5. The constant volume conveying system of claim 4 wherein said flow inducer includes a nozzle having an air inlet connected to a source of pressurized air and an air outlet for directing a jet of said compressed air into said flared opening of said pickup tube.

6. The constant volume conveying system of claim 3 wherein said reservoir includes an inlet section with an inlet opening and a funnel shaped section secured to and disposed beneath said inlet section.

7. The constant volume conveying system of claim 6 wherein said powder metering system includes a multi-vane, helical rotary lock disposed below said funnel shaped section for metering said powder in said reservoir through said powder inlet and into said air stream flowing through said outlet tube.

8. The constant volume conveying system of claim 7 wherein said multi-vane, helical rotary lock includes an impeller constructed of a cylindrical tube having a plurality of vanes extending radially outward therefrom and a shaft extending from said tube for rotating said impeller.

9. A constant volume conveying system adapted for pumping powder to a spray gun, comprising:

an outlet tube having an inlet at one end to receive a pressurized air stream, an outlet at an opposite end, and a powder inlet between said inlet and said outlet to receive metered powder from a reservoir of said powder;

a powder metering system between said reservoir and said powder inlet for metering said powder through said powder inlet and into said air stream flowing through said outlet tube; and a probe for measuring the density of said powder in said reservoir.

10. The constant volume conveying system of claim 9 wherein said probe is a capacitance probe.

11. A constant volume conveying system adapted for pumping powder to a spray gun, comprising:

an outlet tube having an air inlet at one end to receive a pressurized air stream, an outlet at an opposite end, and a powder inlet between said air inlet and said outlet;

a reservoir of said powder having an inlet opening and an outlet opening;

a powder metering system disposed between said outlet opening of said reservoir and said powder inlet of said outlet tube for metering said powder through said powder inlet into said air stream flowing through said outlet tube; and a pressure equalizing system for equalizing the pressure between said reservoir and said outlet tube.

12. The constant volume conveying system of claim 11 wherein said reservoir includes an inlet section having said inlet opening at one end, a funnel shaped section having an upper end connected to said inlet section and a lower end connected to said outlet opening.

13. The constant volume conveying system of claim 12 wherein said pressure equalizing system includes a pressure equalizing tube interconnecting said cylindrical outlet tube and said funnel shaped section so that the pressure in said funnel shaped section is substantially equal to said pressure in said tube.

14. The constant volume conveying system of claim 11 wherein said powder metering system includes a multi-vane, helical rotary lock formed of an impeller constructed of a cylindrical tube having a plurality of vanes extending radially outward therefrom and a shaft extending from said tube for rotating said impeller.

15. A constant volume conveying system adapted for pumping powder to a spray gun, comprising:

an outlet tube having an air inlet at one end to receive a pressurized air stream, an outlet at an opposite end, and a powder inlet between said air inlet and said outlet;

a reservoir of said powder having an inlet opening and an outlet opening, said reservoir including an inlet section having said inlet opening at one end, and a funnel shaped section having an upper end connected to said inlet section and a lower end connected to said outlet opening;

a powder metering system disposed between said outlet opening of said reservoir and said powder inlet of said outlet tube for metering said powder through said powder inlet into said air stream flowing through said outlet tube; and a pressure equalizing system for equalizing the pressure between said reservoir and said outlet tube, said pressure equalizing system including an isolation device mounted between said funnel shaped section and said inlet section of said reservoir to prevent air leakage from said funnel shaped section through said inlet opening.

16. The constant volume conveying system of claim 15 wherein said isolation device includes an impeller with vanes that seal against walls of said inlet section of said reservoir.

17. A constant volume conveying system adapted for pumping powder to a spray gun, comprising:

an outlet tube having an air inlet at one end to receive a pressurized air stream, an outlet at an opposite end, and a powder inlet between said air inlet and said outlet;

a reservoir of said powder having an inlet opening and an outlet opening, said reservoir including an inlet section having said inlet opening at one end, a funnel shaped section having an upper end connected to said inlet section and a lower end connected to said outlet opening;

a powder metering system disposed between said outlet opening of said reservoir and said powder inlet of said outlet tube for metering said powder through said powder inlet into said air stream flowing through said outlet tube;

a pressure equalizing system for equalizing the pressure between said reservoir and said outlet tube; and a control system which controls said powder metering system in response to a sensor which measures the density of the powder in said reservoir and adjusts said powder metering system to maintain a constant flow of powder into said outlet tube.

18. A constant volume conveying system adapted for pumping powder to a spray gun comprising:

an outlet tube having an air inlet receiving pressurized air at one end, an outlet at an opposite end to discharge a constant volume of said powder, and a powder inlet between said inlet and said outlet;

a reservoir of said powder having an inlet opening and an outlet opening, said reservoir having an inlet section with said inlet opening, a funnel shaped section having an upper end connected to said inlet section and a lower end having said outlet opening;

a powder metering system between said outlet opening of said reservoir and said powder inlet of said outlet tube for metering said powder through said powder inlet into said outlet tube;

a controller which controls said powder metering system in response to a sensor which measures a characteristic of said powder in said reservoir; and a pressure equalizing device for equalizing the pressure between said funnel shaped section and said outlet tube.

19. The constant volume conveying system of claim 18 wherein said controller further includes a capacitor sensor in said outlet tube to measure changes in density of said powder flow therethrough and to adjust said powder metering system so that a substantially constant mass of powder flows through said outlet tube.

* * * * *